Aug. 22, 1967     H. NUSBAUM     3,337,223
METALLIC SEAL STRUCTURE
Filed March 2, 1964
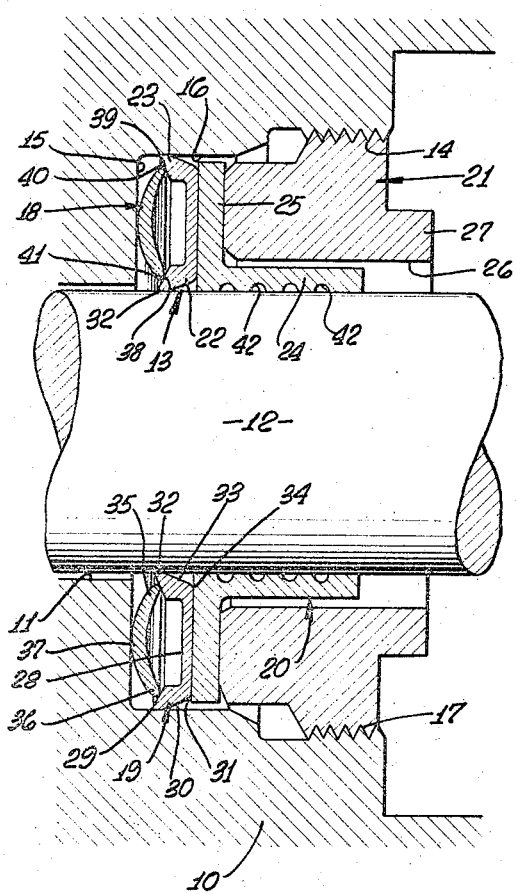
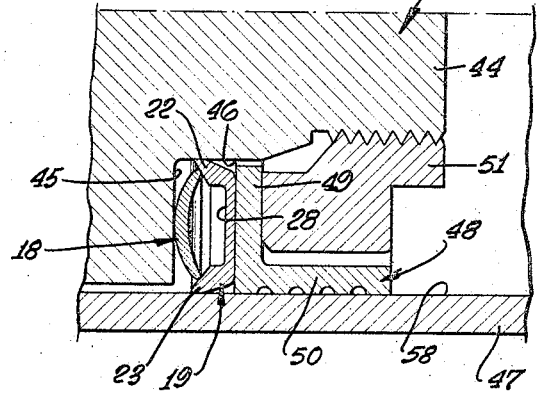
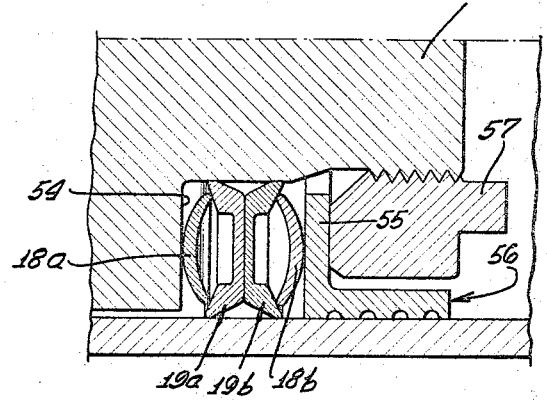
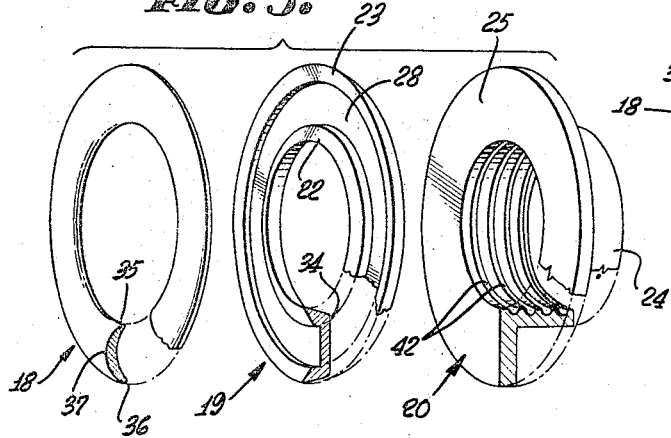
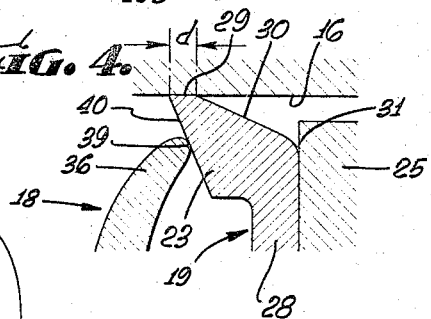
INVENTOR.
*Henry Nusbaum*
BY *Flam and Flam*
ATTORNEYS.

United States Patent Office 3,337,223
Patented Aug. 22, 1967

3,337,223
METALLIC SEAL STRUCTURE
Henry Nusbaum, 109 N. Alta Vista Blvd.,
Los Angeles, Calif. 90036
Filed Mar. 2, 1964, Ser. No. 348,701
10 Claims. (Cl. 277—112)

This invention relates to a seal structure, and particularly to a dynamic seal made of metal or other material suitable for extreme ranges of temperatures and pressures.

One of the objects of this invention is to provide a self compensating seal structure that maintains contact pressure substantially constant despite wear, whereby reliable operation throughout a substantial period of use is ensured.

Another object of this invention is to provide an inexpensive seal structure of this character comprising relatively few simple parts that are easily manufactured.

Another object of this invention is to provide a seal structure that not only achieves a seal to the moving rod or other member, but which also establishes its own seal to the support in which it is mounted.

Still another object of this invention is to provide a seal structure of this character that can easily be installed, and which is effectively held in place.

Still another object of this invention is to provide a seal structure of this character in which the contact pressure may to a certain degree be adjusted.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a fragmentary axial sectional view of the seal structure incorporating the present invention;

FIG. 2 is a fragmentary sectional view similar to FIG. 1, but illustrating an optional mounting of the seal;

FIG. 3 is an axial sectional view similar to FIG. 2 and illustrating a modified form of the present invention;

FIG. 4 is an enlarged fragmentary sectional view showing the edge of the seal ring and the spring ring; and FIG. 5 is an exploded pictorial view showing the basic components of the seal structure, portions of the elements being broken away and shown in section.

In FIG. 1 there is illustrated a support 10 having an access aperture 11. In this access aperture a rod 12 is intended to be reciprocated. A seal structure generally designated at 13 is provided for sealing the access apertures 11 about the exterior cylindrical surface of a rod 12.

The seal structure 13 is accommodated in a counterbore 14 formed at the outer end of the aperture 11. The counterbore has an annular end wall or shoulder 15. A cylindrical wall 16 adjoins the shoulder 15 and forms one of the surfaces at which a seal is established. The outer end of the counterbore is threaded as at 17.

The seal structure comprises four parts: a spring ring 18, a seal ring 19, a bearing 20 and a nut 21. The spring ring 18 is annular and arcuate in cross section. Along a circular line of contact, the medial portion of the spring ring abuts the shoulder 15. The spring ring may be made as a stamping from suitable spring steel or the like. The seal ring 19 has inner and outer annular legs 22 and 23 with ends respectively engaging the exterior cylindrical surface of the rod 12 and the cylindrical surface 16 of the counterbore.

The seal ring 19 is placed upon the spring ring 18 so that the spring ring is seated upon the legs 22 and 23. The seal ring may be made of aluminum, steel or other metal and plated with Teflon, gold, or other substance according to the intended use. The seal ring may be made on a turret lathe or automatic screw machine.

The bearing 20 has a hub portion 24 fitting the rod 12 and a radial flange 25 engaging the outer side of the seal ring 19. The nut 21 has a through aperture 26 circumscribing the bearing hub 24, and the inner end of the nut 21 engages the radial flange 25 for moving the seal ring 19 and the spring ring 18 together. The nut 21 has exterior threads cooperable with threaded outer end 17 of the counterbore. The outer end of the nut has a suitable hexagonal or other non-circular head as at 27 for engagement with a wrench or other suitable tool for its installation. The flange 25 isolates the rotational movement of the nut 21 from the seal ring 19. Movement of the spring ring 18 and seal ring 19 causes the legs 22 and 23 sealingly to engage the rod 12 and surface 16 to achieve a dynamic and static seal respectively. The spring ring 18 and the seal ring 19 have configurations for accomplishing this result.

The bases of the annular legs 22 and 23 of the seal ring 19 are joined by a central web or diaphragm 28. This web is relatively thin, and extends annularly in a radial plane.

The outer leg 23 flares outwardly from the axis to a narrow annular contact band 29 (see also FIG. 4) spaced axially of the web 28. The exterior surface 30 of the leg from the contact band 29 has increasing clearance with respect to the cylindrical surface 16 until it merges into the rear surface of the web 28 at a rounded corner 31. The leg 23 may be flexed outwardly about the annular corner or apex 31 until the requisite contact pressure is achieved at the annular band 29. When so flexed, the central web 28 may bow and resiliently resist such flexure.

Similarly the inner annular leg 22 flares inwardly toward an annular contact area 32 (FIG. 1). The exterior surface 33 of the leg 22 from the contact area 32 has increasing clearance toward an annular apex area 34. The leg 22 may be flexed inwardly about the annular apex 34 as a fulcrum point in order to develop the requisite contact pressure with the exterior cylindrical surface of the rod 12. Such inward flexure of the leg 23 contributes to the bowing of the web portion 28. Since the legs 22 and 23 are relatively rigid, it is the web 28 that bows.

The annular contact bands are designed to have one or two thousandths nominal clearance with respect to the rod 12 and surface 16. This clearance is taken up as the legs are flexed.

Inner and outer arms 35 and 36 of the spring ring smoothly merge together at a central or medial portion 37 (FIG. 5). The thickness of the spring ring 18 decreases gradually from the medial portion 37 in order to achieve the desired flexural characteristics. The end edges 38 and 39 of the spring ring arms 35 and 36 are rounded and respectively engage conical surfaces 41 and 40 of the seal ring legs 23 and 22.

The reaction upon the conical surfaces 40 and 41 impose torques upon the seal ring legs, tending to turn them about their fulcrum areas 31 and 34. After the seal ring legs 22 and 23 engage the rod 12 and surface 16, the spring ring continues to flex, its arms riding outwardly along the conical surfaces 40 and 41 as the nut 21 is rotated. The spring ring exerts a substantially constant force on the seal ring throughout a range of movement of the spring ring. Hence, as wear occurs, the spring ring arms ride inwardly of the legs 22 and 23 along the conical surfaces, and cause the legs 22 and 23 to exert a substantially constant pressure on the rod 12 and surface 16.

The annular bands of contact 29 and 32 are dimensionally controlled as indicated at *d* in FIG. 4. The desired contact pressure and frictional drag are thus achieved.

Since both the inner and outer legs 22 and 23 are engaged by the inner and outer arms of seal ring 19, there is no tendency for either of these parts to be involuted.

The annular contact band 32 prevents flow of fluid along the interior of the seal ring 19 and the contact band 29 prevents fluid flow past the exterior along the rod 12.

The hub 24 of the bearing has a close running fit with the rod 12 and has a series of dust grooves 42. The bearing 20 tends to confine the axis of the rod 12 during its inward or outward movement so as to prevent the imposition of side thrust on the seal ring 19. Furthermore, the radial flange 25, since it has a substantial area of contact with the web 28, serves effectively to transfer heat outwardly of the casing 10 and along the hub 24 or via the nut 21.

In the form of the invention illustrated in FIG. 2, the seal ring 19 and the spring ring 18 are mounted upon the rod 43. The rod 43 has a reduced end 44 that provides a shoulder or end surface 45 against which the spring ring 18 may be seated. Adjoining the shoulder is a cylindrical wall 46 engageable with the inner leg 22 to form a static seal therewith. In this instance the outer leg 23 moves along the cylindrical wall 58 forming the access opening to a case or container 47. A bearing structure 48 in this instance has an inwardly rather than an outwardly directed flange 49 engaging the web 28 of the seal ring 19. The bearing 48 has a hub portion 50 having a running fit with the bore 58.

The nut 51 in this instance has an interiorly threaded aperture 52 for engagement with the threaded outer end of the rod 44. In all other respects, the operation is similar to that described in FIG. 1.

In the form illustrated in FIG. 3, a pair of seal structures is provided in back to back relationship. Thus, sealing rings 19a and 19b are placed back to back upon a reduced extension of a rod 53. A spring ring 18a engages the radial wall or shoulder 54 formed by the reduced extension of the rod 53. A similar spring ring 18b is engaged by the radial flange 55 of a bearing structure 56. The nut 57 acts upon the exterior surface of the radial flange 55 and imposes a loading force that is transmitted to both the spring rings 18a and 18b. The spring deflection per unit of nut travel is halved. The seal is thus achieved in two stages through the annular sealing bands of the ring 19a and 19b.

The inventor claims:

1. In a seal structure: an annular sealing ring made of resilient material having an inner relatively rigid annular sealing leg, an outer relatively rigid annular sealing leg and a relatively flexible web joining the bases of the legs; said legs extending in the same axial direction from said web and defining therewith a channel-like configuration; said sealing ring being bounded by concentric cylinders with the bases of the legs spaced substantially within said bounding cylinders; said legs having on their opposed sides conical surfaces respectively converging in opposite angular directions to define therebetween an annular space converging in a direction toward the bases of said legs; an annular spring loading ring having inner and outer arms respectively slidably engaging said conical surfaces; said loading ring having inner and outer diameters respectively substantially greater and less than the diameters of the inner and outer bounding cylinders to be operatively unrestrained by elements located at said bounding cylinders; said loading ring having a web portion from which said legs extend, said inner and outer loading ring arms being capable of inward and outward resilient flexure respectively about the loading ring web; and means forcing the rings together to flex the loading ring arms in turn to urge the seal ring legs outwardly and inwardly respectively.

2. In a seal structure: an annular sealing ring made of resilient material having an inner relatively rigid annular sealing leg, an outer relatively rigid annular sealing leg and a relatively flexible web joining the bases of the legs; said legs extending in the same axial direction from said web and defining therewith a channel-like configuration; said legs having annular contact bands extending respectively to inner and outer bounding cylinders; the bases of the legs being located axially on one side of said contact bands and radially inwardly of the respective bounding cylinders; said legs having annular surfaces located on the other side of said contact bands; an annular spring loading ring having inner and outer arms respectively engaging said legs at said surfaces; said inner and outer loading ring arms being capable of flexure in directions having an axial component; the said loading ring having inner and outer diameters respectively substantially greater than and less than the diameters of the inner and outer bounding cylinders to be operatively unrestrained by elements located at said bounding cylinders; and means forcing the rings together to flex the loading ring arms in turn to urge the sealing ring legs outwardly and inwardly respectively; flexure of said loading ring arms being opposed by the resilience of said spring loading ring independently of the radial limits of said bounding cylinders.

3. In a seal structure: an annular sealing ring made of resilient material having an inner relatively rigid annular sealing leg, an outer relatively rigid annular sealing leg and a relatively flexible web joining the bases of the legs; said legs extending in the same axial direction from said web and defining therewith a channel-like configuration; said legs having annular contact bands extending respectively to inner and outer bounding cylinders; the bases of the legs being located axially on one side of said contact bands and radially inwardly of the respective bounding cylinders; said legs having annular surfaces located on the other side of said contact bands; an annular spring loading ring having inner and outer arms respectively engaging said legs at said surfaces; said inner and outer loading ring arms being capable of flexure in directions having an axial component; the said loading ring having inner and outer diameters respectively substantially greater than and less than the diameters of the inner and outer bounding cylinders to be operatively unrestrained by elements located at said bounding cylinders; and means forcing the rings together to flex the loading ring arms in turn to urge the sealing ring legs outwardly and inwardly respectively, flexure of said loading ring arms being opposed by the resilience of said spring loading ring independently of the radial limits of said bounding cylinders, said spring ring arms being capable of further flexure when the legs of said sealing ring are confined to store energy in said loading ring for maintaining said contact bands in engagement after wear thereof.

4. In apparatus of the class described: a pair of members having substantially concentric cylindrical surfaces defining an annular space; one of said members having means forming a wall at one end of said space; an annular spring loading ring in the space and engaging said wall, and having inner and outer spring arms capable of flexure toward and away from said wall; said spring arms having operative clearance with respect to said cylindrical surfaces of said members; an annular seal ring in said space and having inner and outer annular legs extending from a connecting annular web; said legs having annular contact bands engageable with said cylindrical surfaces respectively; the bases of the legs being located axially on one side of said contact bands and radially inwardly of said space from said cylindrical surfaces; said legs engaging said arms of said spring loading ring; and clamping means mounted on said one of said members for moving the seal ring to flex said spring ring arms to cause said legs to flex and said contact bands into engagement with said cylindrical surfaces.

5. In apparatus of the class described: a pair of members having substantially concentric cylindrical surfaces defining an annular space; one of said members having means forming a wall at one end of said space; an annular spring loading ring in the space and engaging said wall, and having inner and outer spring arms capable of flexure toward and away from said wall; said spring arms having operative clearance with respect to said cylindrical surfaces of said members; an annular seal ring in said space and having inner and outer annular legs extending from a connecting annular web; said legs having annular contact bands engageable with said cylindrical surfaces respectively; the bases of the legs being located axially on one side of said contact bands and radially inwardly of said space from said cylindrical surfaces; said legs engaging said arms of said spring loading ring; and a nut threadedly mounted on said one of said members for moving the seal ring to flex said spring ring arms to cause said legs to flex and said contact bands into engagement with said cylindrical surfaces.

6. In apparatus of the class described: a pair of members having substantially concentric cylindrical surfaces defining an annular space; one of said members having means forming a wall at one end of said space; an annular spring loading ring in the space and engaging said wall, and having inner and outer spring arms capable of flexure toward and away from said wall; said spring arms having operative clearance with respect to said cylindrical surfaces of said members; an annular seal ring in said space and having inner and outer relatively rigid annular legs extending from a relatively flexible, resilient connecting annular web; said legs having annular contact bands engageable with said cylindrical surfaces respectively; the bases of the legs being located axially on one side of said contact bands and radially inwardly of said space from said cylindrical surfaces; said legs engaging said arms of said spring loading ring; and clamping means mounted on said one of said members for moving the seal ring to flex said spring ring arms to cause said legs to flex and said contact bands into engagement with said cylindrical surfaces.

7. In apparatus of the class described: a pair of members having substantially concentric cylindrical surfaces defining an annular space; one of said members having means forming a wall at one end of said space; an annular spring loading ring in the space and engaging said wall, and having inner and outer spring arms capable of flexure toward and away from said wall; said spring arms having operative clearance with respect to said cylindrical surfaces of said members; an annular seal ring in said space and having inner and outer annular legs extending from a connecting annular web; said legs having annular contact bands engageable with said cylindrical surfaces respectively; the bases of the legs being located axially on one side of said contact bands and radially inwardly of said space from said cylindrical surfaces; said legs having annular surfaces opposed to and engaging the ends of said spring ring arms on the other side of said contact bands; and clamping means mounted on said one of said members for moving the seal ring to flex said spring ring arms to cause said legs to flex and said contact bands into engagement with said cylindrical surfaces; said spring ring arms being capable of continued flexure after said contact bands are in engagement with said cylindrical surfaces, and moving along said leg surfaces to store energy for maintaining said contact bands in engagement despite wear of said legs.

8. In apparatus of the class described: a pair of members having substantially concentric cylindrical surfaces defining an annular space; one of said members having means forming a wall at one end of said space; an annular spring loading ring in the space and engaging said wall, and having inner and outer spring arms capable of flexure toward and away from said wall; said spring arms having operative clearance with respect to said cylindrical surfaces of said members; an annular seal ring in said space and having inner and outer annular legs extending from a connecting annular web; the bases of the legs being located axially on one side of said contact bands and radially inwardly of said space from said cylindrical surfaces; said legs engaging said arms of said spring loading ring; a nut threadedly mounted on said one of said members for moving the seal ring to flex said spring ring arms to cause said legs to flex and said contact bands into engagement with said cylindrical surfaces; and a bearing having a flange upon which the nut reacts for isolating the rotational movement of the nut.

9. In apparatus of the class described: a pair of members having substantially concentric cylindrical surfaces defining an annular space; one of said members having means forming a wall at one end of said space; an annular spring loading ring in the space and engaging said wall, and having inner and outer spring arms capable of flexure toward and away from said wall; said spring arms having operative clearance with respect to said cylindrical surfaces of said members; an annular seal ring in said space and having inner and outer annular legs extending from a connecting annular web; the bases of the legs being located axially on one side of said contact bands and radially inwardly of said space from said cylindrical surfaces; said legs engaging said arms of said spring loading ring; a nut threadedly mounted on said one of said members for moving the seal ring to flex said spring ring arms to cause said legs to flex and said contact bands into engagement with said cylindrical surfaces; and a bearing having a flange upon which the nut reacts for isolating the rotational movement of the nut, said bearing forming a heat sink for said seal ring.

10. In a seal structure cooperable with companion coaxial cylindrical elements defining an annular space between them: an annular sealing ring having inner and outer sealing legs designed respectively to engage said companion elements, said sealing ring legs having free ends extending in the same axial direction, said sealing ring being bounded by concentric cylinders corresponding to the inner and outer boundaries of said annular space, said sealing ring being capable of flexure to expand said sealing legs upon existence of wear between said elements and said sealing ring legs; an expansible and contractable spring loading device; means forming an operative connection between the spring loading device and said sealing ring so that the resilient force of said device tends to urge said sealing ring toward sealing position; and means storing energy in said spring loading device to cause said sealing ring arms to be urged toward sealing position; said spring loading device having a size to be confined entirely between said bounding cylinders with sufficient clearance to be operatively unrestrained by said elements at the inner and outer boundaries of said annular space; storage of energy in said spring loading device being opposed by the resilience of said spring loading device as the device changes its configuration and independently of the radial limits of said space.

References Cited

UNITED STATES PATENTS 2,783,106  2/1957  Barnhart _____ 277—206.1

FOREIGN PATENTS 738,055  10/1955  Great Britain.
69,553  7/1893  Germany.

LAVERNE D. GEIGER, *Primary Examiner.*

D. MASSENBERG, *Assistant Examiner.*